United States Patent [19]
Stace et al.

[11] Patent Number: 5,793,520
[45] Date of Patent: Aug. 11, 1998

[54] OPTICAL CROSS BAR SWITCH ASSEMBLY

[75] Inventors: Christopher Stace; Henry J. White, both of Bristol, United Kingdom

[73] Assignee: British Aerospace Public Limited Company, Farnborough, Great Britain

[21] Appl. No.: 572,669

[22] Filed: Dec. 14, 1995

[30] Foreign Application Priority Data

Dec. 15, 1994 [GB] United Kingdom ............... 9426377

[51] Int. Cl.$^6$ ........................................... G02F 1/29
[52] U.S. Cl. ........................ 359/320; 359/318; 359/619
[58] Field of Search ............................... 359/318, 320, 359/619, 629, 636

[56] References Cited

U.S. PATENT DOCUMENTS

| | | | |
|---|---|---|---|
| 4,856,863 | 8/1989 | Sampsell et al. | 350/96.16 |
| 4,923,269 | 5/1990 | Healey | 350/96.15 |
| 5,037,173 | 8/1991 | Sampsell et al. | 385/17 |
| 5,521,748 | 5/1996 | Sarraf | 359/321 |

FOREIGN PATENT DOCUMENTS 2243967 11/1991 United Kingdom .

OTHER PUBLICATIONS

Michael R. Feldman and Clark C. Guest, "Iterative Encoding of High–Efficiency Holograms for Generation of Spot Arrays", Optical Society of America, May 15, 1989, vol. 14, No. 10, pp. 479–481.

H. Dammann and K. Gortler, "High–Efficiency In–Line Multiple Imaging by Means of Multiple Phase Holograms", Optics Communications, Jul. 1971, vol. 3, No. 5, pp. 312–315.

*Primary Examiner*—Georgia Y. Epps
*Assistant Examiner*—Dawn-Marie Bey
*Attorney, Agent, or Firm*—Cushman Darby & Cushman IP Group of Pillsbury Madison & Sutro LLP

[57] ABSTRACT

An optical cross bar switch assembly includes a first lens device (5) in the form of an array of lenslets (5a) operable to receive light from the input optical fiber array (1) in a manner such that the light from each fiber is received and collimated separately by an associated one of the lenslets (5a) with the collimated light from the array (5) being passed to a fan out grating element (3) which angularly diffracts and replicates the light from the input optical fibers.

13 Claims, 2 Drawing Sheets

OPTICAL CROSS BAR SWITCH ASSEMBLY

This invention relates to an optical cross bar switch assembly for transferring a light image from an array of input optical fibers to an array of output optical fibres.

Optical cross bar switch assemblies are known which utilise spatial light modulators (SLM) and lens systems to transfer the image of an input fibre array to an output fibre array. With such previously proposed assemblies the spacing of the input fibres is limited by their diameter and this makes it more difficult to achieve miniaturisation of the assemblies as in assemblies which include a spatial light modulator with small pixel spacings there is the probable need for a demagnification stage to match the spacing of the fibres in the input array to the pixel pitch of the spatial light modulator. It is desirable to miniaturise the assemblies to improve their stability and ruggedness in relatively hostile environments.

There is thus a need for an optical cross bar switch assembly which can have a reduced size without reducing the functionality of the switch.

According to one aspect of the present invention there is provided an optical cross bar switch assembly for transferring a light image from an array of input optical fibres to an array of output optical fibres via switch assembly parts including at least three lens devices, a fan out grating element, and a spatial light modulator, wherein the first lens device is an array of lenslets operable to receive light from the input optical fibre array in a manner such that the light from each fibre is received and collimated separately by an associated one of the lenslets, with the collimated light from the first lens device lenslet array being passed to the fan out grating element which angularly diffracts and replicates the light from the input optical fibres.

Preferably the second lens device is located to receive diffracted light from the fan out grating element and combine the diffracted light into an array of foci, and wherein the third lens device is an array of lenslets located to receive light from the second lens device and collimate the light from each of the foci for passage through the spatial light modulator to the array of output optical fibres.

Conveniently the spatial light modulator incorporates a liquid crystal layer and the assembly includes a polarising element aligned substantially with the optimum input axis of the liquid crystal layer of the spatial light modulator, which polarising element is located between the third lens device and the spatial light modulator.

Advantageously the spatial light modulator is a transmission spatial light modulator incorporating an analysing polarisation element, and the assembly includes a forth lens device located on the side of the spatial light modulator directed towards the array of output optical fibres when present, with the fourth lens device being in the form of an array of lenslets operably each to focus light received form the spatial light modulator. individually onto individual fibres of the array of output optical fibres, and with the analysing polarisation element being located between the spatial light modulator and the fourth lens device.

Preferably the spatial light modulator is a reflection spatial light modulator operable to switch received light in polarisation and reflect the polarisation switched light, wherein the third lens device is an array of lenslets operable to collimate received light for passage to and from the spatial light modulator, and wherein the assembly includes a polarising beam splitter operable to transmit light to the spatial light modulator, to receive the polarisation switched light reflected back from the spatial light modulator and split out the received polarisation switched light through substantially 90 degrees to the direction of light transmission through the polarising beam splitter.

Conveniently the polarising beam splitter is located between the fan out element and the second lens device, and the assembly includes a relay lens device located on the output side of the polarising beam splitter to receive therefrom the split out polarisation switched light and refocus it onto individual fibres of the array of output optical fibres.

Advantageously the polarising beam splitter is located between the second lens device and the third lens device in a manner such that the foci of light beams received from the second lens device lie within the polarising beam splitter, and the assembly includes a relay lens device in the form of an array of lenslets located on the output side of the polarising beam splitter to receive therefrom the split out polarisation switched light beams and focus them onto the individual fibres of the array of output optical fibres.

Preferably the polarising beam splitter is located between the second lens device and the third lens device in a manner such the foci of light received from the second lens device lies between the second lens device and the polarising beam splitter, so that the split out polarisation switched light beams each form a focal point outside the polarising beam splitter on the output side thereof whereby the array of output optical fibres can be placed with individual fibres at the respective focal points.

Conveniently the second lens device has five elements and the third lens device is a holographic element positioned between the polarising beam splitter and the spatial light modulator.

Advantageously the second lens device is a GRIN lens.

Preferably the polarising beam splitter is located between the third lens device and the spatial light modulator and the assembly includes a pair of spaced apart lens devices located between the polarising beam splitter and the spatial light modulator and operative to re-image the parallel light beams received from the polarising beam splitter for passage to and from the spatial light modulator.

For a better understanding of the present invention, and to show how the same may be carried into effect, reference will now be made, by way of example, to the accompanying drawings which:

Figure 1:
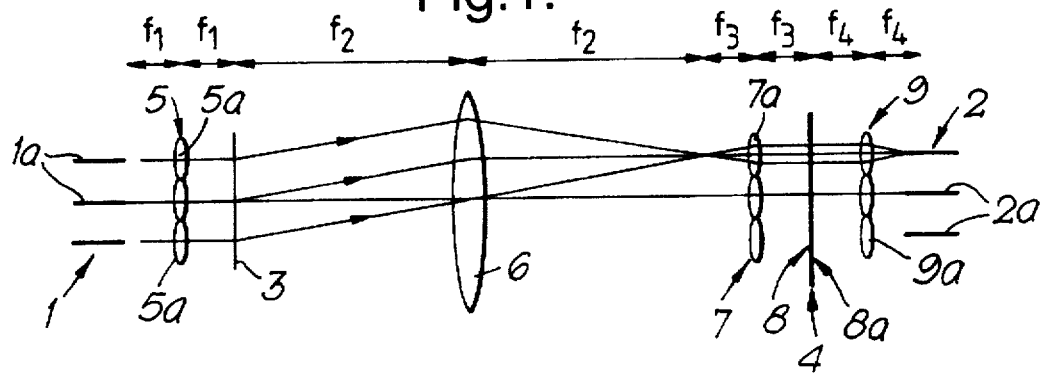
FIG. 1 is a schematic view of an optical cross bar switch assembly according to a first embodiment of the present invention.
Figure 2:
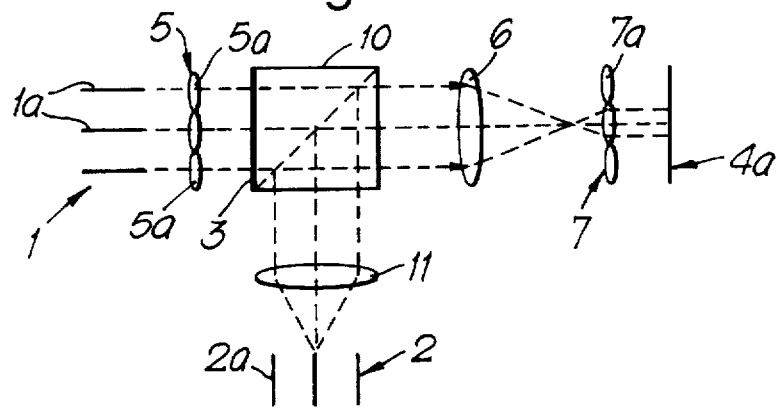
FIG. 2 is a schematic view of an optical cross bar switch assembly according to a second embodiment of the present invention.

An optical cross bar switch assembly according to the present invention is intended for transferring a light image from an array of input optical fibres 1 to and array 2 of output optical fibres. The assembly includes at least three lens devices, a fan out grating element 3 and a spatial light modulator (SLM) 4. The first lens device 5 as shown particularly in the embodiments of FIGS. 1 and 2 is an array of lenslets 5a operable to receive light from the input optical fibre array 1 in a manner such that the light from each fibre 1a is received and collimated separately by an associated on of the lenslets 5a with the collimated light from the array 5 being passed to the fan out grating element 3 which angularly diffracts and replicates the light from the input optical fibres 1a. In FIG. 1 of the accompanying drawings the focal length of the lens array 5 is indicated by $f_1$.

In the FIG. 1 example according to the present invention, the second lens device 6 is a conventional lens of focal length $f_2$ which is located to receive diffracted light from the fan out grating element 3 and combine the diffracted light into an array of foci each of which is contributed to by all the input sources. The assembly also includes a third lens device 7 which also is an array of lenslets 7a located to receive light from the second lens device 6 and collimates the light from each foci for passage through the SLM 4 to the array 2 of optical output fibres. The third lens device 7 has a focal length $f_3$ and the input array fibres 1a are sufficiently spaced apart that the light from each source becomes separated from each other and can pass through the pixels of the SLM 4 unmixed. The SLM 4 has a liquid crystal layer (not illustrated) and the assembly includes a polarising element 8 located between the third lens device 7 and the SLM 4. The element 8 may be dispensed with if polarisation preserving input fibres 1a are used.

This polarising element 8 is aligned substantially with the optimum input axis of the liquid crystal layer of the SLM 4.

In the embodiment of FIG. 1 the SLM 4 is a transmission SLM and a further polarising element 8a is included between the SLM 4 and a fourth lens device 9. The element 8a is an analysing polarisation element through which the transmitted light passes if the SLM 4 has switched the light. The assembly includes a fourth lens device 9 again in the form of an array of lenslets 9a each of focal length $f_4$. The lenslets 9a focus the light onto the array 2 of output fibres 2a. The fourth lens device 9 is located between the SLM 4 and the array 2 of output optical fibres. The embodiment of FIG. 1 in which the SLM 4 is a transmission spatial light modulator requires the use of polarising elements to provide switching, with the element 8a blocking the light not switched by the SLM 4. Thus in this embodiment it may be either the light that is blocked or transmitted by the analysing element 8a that has had its polarisation rotated by the SLM 4. Only if the SLM 4 has rotated the polarisation of light hitting a particular pixel of the SLM does that light pass through the element 8a.

Alternatively a reflection mode SLM 4a can be utilised as shown in the embodiments of FIGS. 2 to 7. In these embodiments a polarising beam splitter 10 is used instead of the polarising light element 8 in the transmission mode SLM 4 of the FIG. 1 embodiment. In the FIG. 2 example light is passed through the beam splitter 10, second lens device 6 and third lens device 7 to the SLM 4a where it is switched in polarisation, reflected back through the lens devices 7 and 8 and split out at the beam splitter 10 so that the split out polarisation switched light is turned through substantially 90 degrees to the direction of light transmission through the beam splitter 10. The split out light is passed through relay lens 11 which is required to refocus the beams into the array 2 of output optical fibres. This design necessarily means that the light reflected from the SLM 4a must necessarily pass through the lens devices 7, 6 and 11 which makes the optical design of these lens devices critical.

Figure 3:
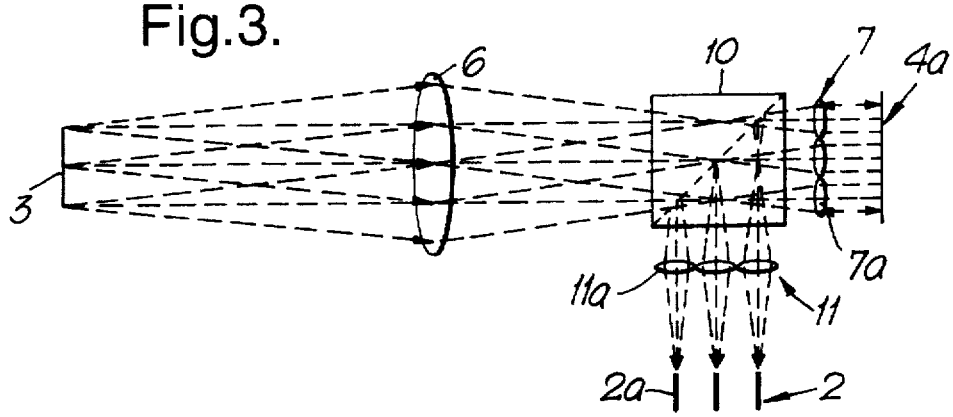
FIG. 3 is a schematic view of part of an optical cross bar switch assembly according to a third embodiment of the present invention.

The embodiment of FIG. 3 avoids this by utilising only two lens devices for the light reflected from the SLM 4a namely the third lens device which is an array of lenslets 7a and the relay lens 11 which in this embodiment is also an array of lenslets 11a. As can be seen from FIG. 3 in this embodiment the beam splitter 10 is located between the second lens device 6 and the third lens device 7 so that the foci of light beams received from the second lens device 6 lie within the beam splitter 10. The third lens device 7, by means of its lenslets 7a, collimates the beams before they reach the SLM 4a. The beams are reflected by the SLM 4a and if their polarisation has been switched they are then reflected by the beam splitter 10 and the reflected beams are collected by the relay lens 11, lenslets 11a and focused thereby onto individual fibres 2a of the array 2 of output optical fibres. Thus only if the SLM 4a rotates the polarisation of light hitting a particular pixel of the SLM does that light get reflected by the polarising beam splitter 10.

Figure 4:
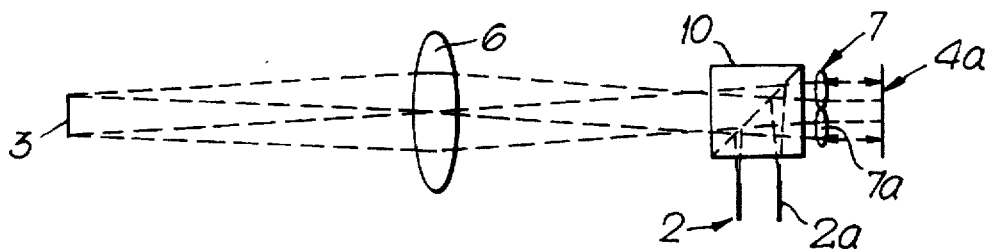
FIG. 4 is a schematic view of part of an optical cross bar switch assembly according to a fourth embodiment of the present invention.

In the FIG. 4 embodiment the beam splitter 10 is located between the second lens device 6 and the third lens device 7 so that the focus from lens device 6 lies in front of the beam splitter 10. In this embodiment the polarisation switched light reflected back from the SLM 4a and split out at the beam splitter 10 forms a focus outside the beam splitter 10 so that the output fibres 2a of the array 2 of output optical fibres can be placed directly at the focal points. Although the embodiment of FIG. 4 is simpler in design than that of FIG. 3, it cannot accommodate as many pixels in the SLM 4a as that of FIG. 3 and indeed may only accommodate as little as half the arrangement of FIG. 3.

Figure 5:
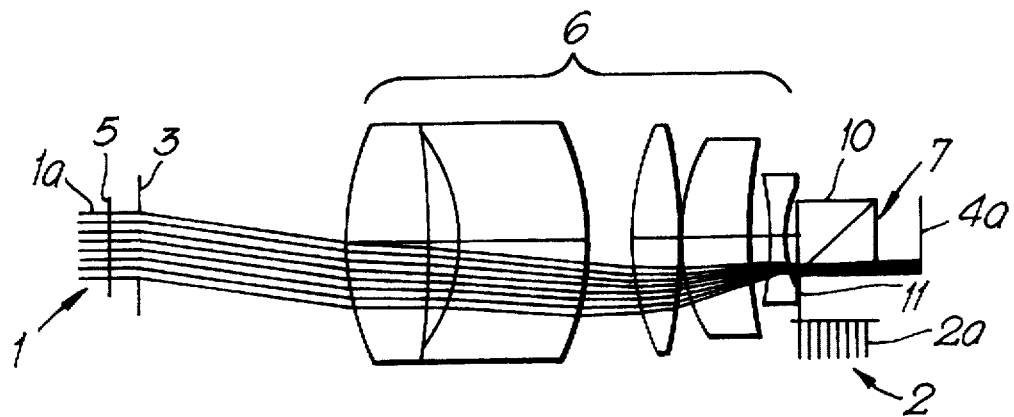
FIG. 5 is a schematic view of an optical cross bar switch assembly according to a fifth embodiment of the present invention.

In the embodiment of the invention as shown in FIG. 5, the second lens device 6 is made up of five elements and the third lens device 7 is a holographic element positioned between the beam splitter 10 and the SLM 4a. In this embodiment light from the input fibres 1a passes through the first lens device 5 lenslets 5a where it is collimated and passed to the fan out grating element 3 in the aperture stop plane. The holographic element forming the third lens device 7 is conveniently attached to the back surface of the beam splitter 10. Light reflected back from the mirror of the SLM 4a passes back through the lens device 7 and is reflected at 90 degrees by the beam splitter 10 and collected by the relay lens device 11 which is an array of lenslets to form a focus at which the output fibres 2a can be placed. A cross bar switch assembly made according to the embodiment of FIG. 5 can provide a 64×64 switch.

Figure 6:
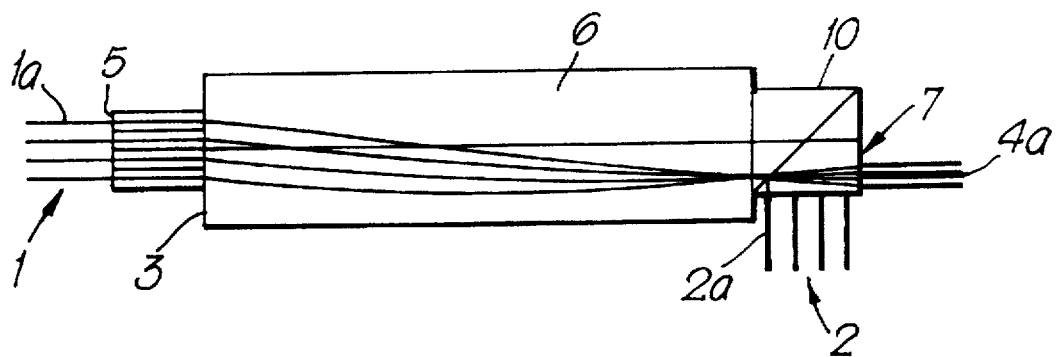
FIG. 6 is a schematic view of an optical cross bar switch assembly according to a sixth embodiment of the present invention and, FIG. 7 is a schematic view of part of an optical cross bar switch assembly according to a seventh embodiment of the present invention.

The embodiment of FIG. 6 is able to provide a 10×16 optical cross bar switch of small size such as having a total length of 6 mm. In this embodiment the second lens device 6 is a GRIN lens. The foci from the GRIN lens 6 lie in front of the beam splitter 10 allowing the output fibres 2a to be placed immediately behind the beam splitter without needing additional arrays of micro lens. The array 1 of input fibres is mounted onto a silica substrate and on the other surface of the substrate is mounted the array of collimating lenslets 5a. The fan out element 3 is etched into another piece of silica and bonded to both the collimating lenslets 5a and the GRIN lens 6. The beam splitter 10 is bonded directly to the GRIN lens 6 and the third lens device 7 is placed between the beam splitter 10 and the SLM 4a. The light reflected by the SLM 4a and split off by the beam splitter 10 is focused at the output face of the beam splitter 10 and the output fibre array 2 is bonded directly to this face. An assembly with an overall length of 6 mm and a diameter of 1 mm can by produced according to this embodiment.

Figure 7:
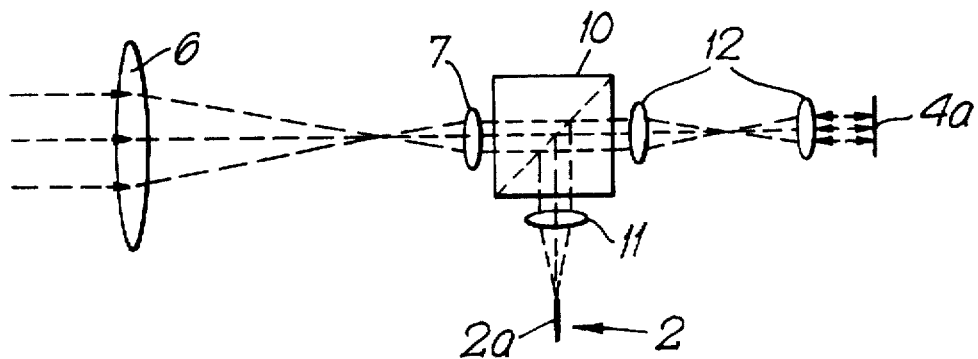

In the embodiment of FIG. 7, the polarising beam splitter 10 is placed between the third lens device 7 and the reflective SLM 4a. Further lens devices 12 are necessary in this embodiment to reimage the parallel beamlets so that they can pass through the SLM 4a.

In all embodiments of the invention the lenslet arrays may be made in any suitable manner such as from diffractive or refractive elements or holographic lens. Additionally the spatial light modulator need not use liquid crystals or polarising elements. Any suitable SLM may be used which blocks certain optical paths from the input fibres 1a to the output fibres 2a.

We claim:

1. A cross bar switch assembly, comprising:

an array of input optical fibres;

a first lens device disposed on an output side of said input optical fibres to receive light output from said input optical fibres;

a fan out grating element disposed on an output side of said first lens device to receive light output from said first lens device and to angularly diffract and substantially replicate an intensity profile of said received light output from said first lens device;

a second lens device disposed on an output side of said fan out grating element to receive angularly diffracted and substantially replicated light output from said fan out grating and to effect a convergence of light emitted to an output side of said second lens device;

a third lens device disposed on an output side of said second lens device to receive said light output to said output side of said second lens device;

a spatial light modulator disposed on an output side of said third lens device to receive light output from said third lens device; and an array of output optical fibres constructed and arranged to receive light output from said spatial light modulator, wherein said first lens device is an array of lenslets operable to receive light from each fibre of said array of input optical fibres is received and collimated separately by an associated one of said lenslets.

2. A cross bar switch assembly according to claim 1, wherein said second lens device is a lens device selected from the group of lens devices consisting of A, B and C, wherein A is a single positive lens element, B is a compound lens unit having an overall positive refractive power, and C is a gradient index of refraction lens unit having a positive refractive power.

3. A cross bar switch assembly according to claim 2, further comprising a polarising beam splitter disposed between said second lens device and said third lens device, wherein said spatial light modulator is a reflection spatial light modulator operable to switch received light in polarisation and reflect polarisation switched light, and said beam splitter transmits light from said second lens element to said spatial light modulator, receives said polarisation switched light reflected back from said spatial light modulator, and splits out said received polarisation switched light through substantially 90 degrees to the direction of light transmission through said polarising beam splitter.

4. A cross bar switch assembly according to claim 1, wherein the second lens device is located to receive said angularly diffracted light from the fan out grating element and combine the diffracted light into an array of foci, and wherein the third lens device is an array of lenslets located to receive light from the second lens device and collimate the light from each of the foci for passage through the spatial light modulator to the array of output optical fibres.

5. A cross bar assembly according to claim 4, wherein the spatial light modulator incorporates a liquid crystal layer and includes a polarising element aligned substantially with the optimum input axis of the liquid crystal layer of the spatial light modulator, said polarising element being located between the third lens device and the spatial light modulator.

6. A cross bar switch assembly according to claim 5, wherein the spatial light modulator is a transmission spatial light modulator incorporating an analysing polarisation element, and wherein the cross bar switch assembly includes a fourth lens device located on the side of the spatial light modulator directed towards the array of output optical fibres when present, with the fourth lens device being in the form of an array of lenslets operably each to focus light received from the spatial light modulator individually onto individual fibres of the array of output optical fibres, and with the analysing polarisation element being located between the spatial light modulator and the fourth lens device.

7. A cross bar switch assembly according to claim 1, wherein the spatial light modulator is a reflection spatial light modulator operably to switch received light in polarisation and reflect the polarisation switched light, wherein said third lens device is an array of lenslets operable to collimate received light from passage to and from the spatial light modulator, and the assembly further comprises a polarising beam splitter operably to transmit light to the spatial light modulator, receive the polarisation switched light reflected back from the spatial light modulator and split out the received polarisation switched light through substantially 90 degrees to the direction of light transmission through the polarising beam splitter.

8. A cross bar switch assembly according to claim 7, wherein the polarising beam splitter is located between the fan out element and the second lens device, and wherein the assembly includes a relay lens device located on the output side of the polarising beam splitter to receive therefrom the split out polarisation switched light and refocus it into individual fibres of the array of output optical fibres.

9. A cross bar switch assembly according to claim 7, wherein the polarising beam splitter is located between the second lens device and the third lens device in a manner such that the foci of light beams received from the second lens device lie within the polarising beam splitter, and wherein the assembly includes a relay lens device in the form of an array of lenslets located on the output side of the polarising beam splitter to receive therefrom the split out polarisation switched light beams and focus them onto the individual fibres of the array of output optical fibres.

10. A cross bar switch assembly according to claim 9, wherein the second lens device has five elements and wherein the third lens device is a holographic element positioned between the polarising beam splitter and the spatial light modulator.

11. A cross bar switch assembly according to claim 9, wherein the second lens device is a GRIN lens.

12. A cross bar switch assembly according to claim 9, wherein the polarising beam splitter is located between the third lens device and the spatial light modulator, and wherein the assembly includes a pair of spaced apart lens device located between the polarising beam splitter and the spatial light modulator and operably to re-image the parallel light beams received from the polarising beam splitter for passage to and from the spatial light modulator.

13. A cross bar switch assembly for transferring a light image from an array of input optical fibres to an array of output optical fibres via switch assembly parts comprising:

a least three lens devices;

a fan out grating element; and a spatial light modulator, wherein a first lens device of said at least three lens devices is an array of lenslets operable to receive light from the array of input optical fibres in a manner such that the light from each fibre of said array of input optical fibres is received and collimated separately by an associated one of the lenslets, with the collimated light from the first lens device lenslet array being passed to the fan out grating element which angularly diffracts and replicates the light from the input optical fibres, wherein the spatial light modulator is a reflection spatial light modulator operable to switch received light in polarisation and reflect the polarisation switched light, wherein a third lens device of said at least three lens devices is an array of lenslets operable to collimate received light from passage to and from the spatial light modulator, the assembly further comprises a polarising beam splitter operable to transmit light to the spatial light modulator, receive the polarisation switched light reflected back from the spatial light modulator and split out the received polarisation switched light through substantially 90 degrees to the direction of light transmission through the polarising beam splitter, and wherein the polarising beam splitter is located between a second lens device and the third lens device in a manner such that the foci of light received from the second lens device lie between the second lens device and the polarising beam splitter, so that the split out polarisation switched light beams each form a focal point outside the polarising beam splitter on the output side thereof whereby the array of output optical fibres can be placed with individual fibres at the respective focal points.

* * * * *